May 20, 1924.
O. R. BRINEY
SPRING MEANS FOR PACKING RINGS
Filed Sept. 25, 1922
1,494,886
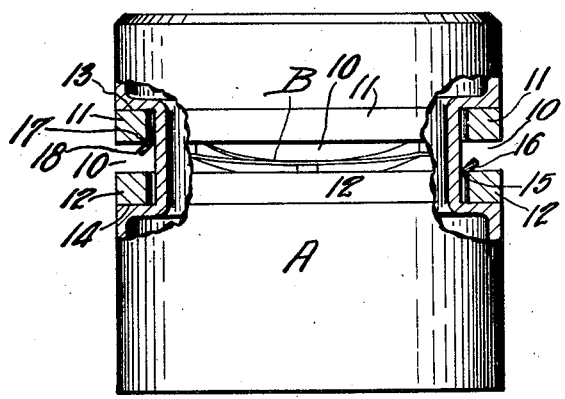
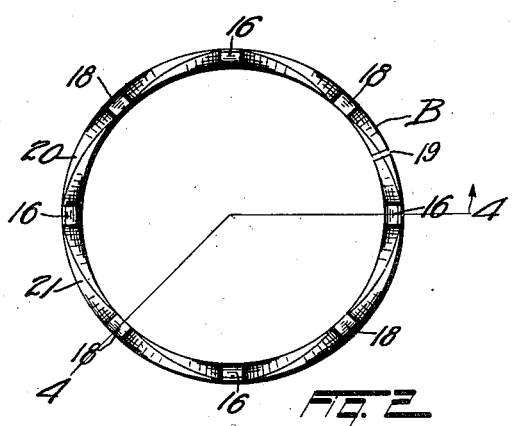
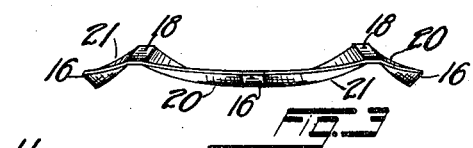
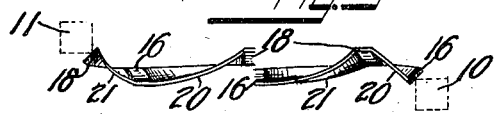
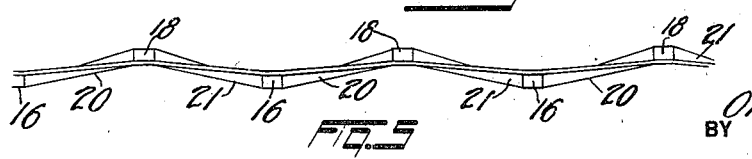
INVENTOR
Otis R. Briney
BY
ATTORNEY Patented May 20, 1924.

1,494,886

UNITED STATES PATENT OFFICE.

OTTIS R. BRINEY, OF PONTIAC, MICHIGAN.

SPRING MEANS FOR PACKING RINGS.

Application filed September 25, 1922. Serial No. 590,295.

*To all whom it may concern:*

Be it known that I, OTTIS R. BRINEY, a citizen of the United States, and a resident of Pontiac, county of Oakland, and State of Michigan, have invented a new and useful Improvement in Spring Means for Packing Rings, of which the following is a specification.

My invention relates to means for forcing packing rings upon their seats.

The object of my invention is an efficient and simple means adapted to act on one or more packing rings, either new or old, to force the same upon their seat or seats to prevent leakage.

Packing rings, generally, wear down soon after installation, begin to leak, and require frequent adjustment, or tightening up in some manner, or renewal.

In piston rings of internal combustion engines for instance, such adjustment is quite inconvenient and expensive.

The present invention aims to eliminate such inconveniences by providing a spring means which automatically compensates for inaccuracies in the machining of the piston and the piston rings and also for the wear of the rings or groove by forcing the rings upon their seats.

It will be seen that the present invention is applicable to old structures as well as to new ones, and that the cost of installation of the new mechanism in an old structure is very low, and that the cost of production of new structures embodying the features of the present invention is very low since neither the packing rings nor the receptacle for these packing rings need to be machined accurately; thereby not only saving considerable time in machining the parts, but also in fitting, testing and such other operations as are now found necessary to perform.

In the accompanying drawing, I illustrate my invention as applied to the piston rings of an internal combustion engine; in which drawing Fig. 1 is a side view of a piston, partly in section to show clearly the relation of the elements of the present invention; Fig. 2 is a plan view of the spring shown in Fig. 1; Fig. 3 is a side view of the spring shown in Fig. 2; Fig. 4 is a section on line 4—4 of Fig. 2; Fig. 5 is a development of the outer circumferential edge of a portion of the spring.

Similar reference characters refer to similar parts throughout the views.

The piston A is, in this instance, provided with one groove 10 which is sufficiently wide and deep to accommodate the piston rings 11 and 12 and the spring B. The walls 13 and 14 are smoothly finished to provide a good lateral seat for the rings 11 and 12 respectively. The distance between these walls or, in other words, the width of the groove 10, needs not to be finished to close limits since the spring forces the rings thereagainst. This feature of eliminating close limits on the width of the groove reduces the cost of production of the piston considerably since formerly the piston rings had to fit closely into the groove to prevent not only leakage but also to prevent the piston rings from moving sidewise and wear away their sides as well as the walls of the groove due to the constant reversals of the piston when in operation.

The piston rings 11 and 12 are, in this instance, made of the usual form and are split as usual. These rings are so made that they have sufficient inherent spring tendency to force themselves radially outward against the cylinder bore as usual.

When installing the present invention in an old piston, the old rings may be used even if they are worn; the spring B forces them upon their seats both laterally and radially.

When installing the present invention in a new piston, the new rings need to be smoothly machined only on the side faces which abut the walls 13 and 14 and need to be accurately machined only on the outer circumferential surface to conform to the curvature of the cylinder bore.

The other side faces and the inner circumferential surface need not be smoothly machined, neither does the width of the rings be machined to close limits since they do not fill the groove and their width is not depended upon to prevent leakage.

This feature of eliminating close limits and accurate machine work and fitting further reduces the cost of production of the piston rings.

The spring B, preferably made of flat spring steel which is able to withstand high temperatures, is first made as an annular ring and is then corrugated, thereby forming, in the present instance, four high points 15 and the inclined faces 16 on one side of the spring and four high points 17 and the inclined faces 18 on the other side. The remaining portions of the spring may be formed to any convenient shape.

It is observed that the corrugations here formed are not of such regular formation as is usual in corrugations. Since the body is made of flat stock substantially in a plane parallel with the ring, and the faces 16 and 18 being inclined, the corrugations are higher on one edge of the spring than on the other, thereby forming skew shaped corrugations.

The inclined faces 16 and 18 rest against one of the inner corners of the rings 11 and 12 respectively as shown and the inclination and the height of these faces should be so gauged that the spring, by its inherent spring action, forces the rings 11 and 12 not only laterally against their seats on the walls of the groove, but also help to force the rings radially outward against the cylinder bore and to compensate for whatever reaction or loss of the inherent spring tendency in the rings which may have occurred at the walls 13 and 14 due to friction caused by the lateral action of the spring B.

In order to permit the spring B to be inserted into place and to help its free action as a spring, a small section is cut out, thus providing the opening 19.

The spring action of the spring B resides mainly in the sides 20 and 21 of the corrugations and the pressure exerted by the spring is primarily lateral. This spring action is greatly enhanced by the twisted formation of the sides 20 and 21 which twist is produced by the formation of the inclined surfaces 16 and 18.

It is noted that all of the faces 16 act inclinedly on the ring 12 while all of the faces 18 act inclinedly on the ring 11. The one spring B thereby forces the ring 12 laterally downward and radially outward and the ring 11 laterally upward and radially outward.

In former piston rings, leaks usually occur at the faces 13 and 14 because there is no provision for holding the rings to these faces. The present invention provides such a means and thereby prevents leakage there.

I am aware that modifications may be made, both as to structure and as to application; therefore, without limiting myself to the precise construction and application shown and described,

I claim:

1. A spring for packing rings, radially expansible and adapted to be disposed at one side of a packing ring with the normal plane of this spring parallel with the plane of this packing ring and this spring formed with corrugations having the tops thereof inclined to said plane and adapted to contact this ring and exert an oblique pressure thereon.

2. A spring for packing rings having a radially expansible annular body, rectangular in cross-section, and the longer sides of this rectangle substantially radial, and formed with corrugations having the tops thereof inclined and adapted to contact a packing ring and exert an oblique pressure thereon.

3. A spring for packing rings, radially expansible and having skew corrugations and the tops of these corrugations adapted to contact a packing ring and exert an oblique pressure thereon.

4. A spring for packing rings, radially expansible and having skew corrugations with the tops thereof inclined to form angular faces adapted to contact a packing ring and exert an oblique pressure thereon.

5. In combination, a pair of packing rings spaced apart, a radially expansible spring in said space and provided with corrugations extending alternately on each side thereof, the tops of each of said corrugations inclined, and said tops on one side of said spring contacting one of said rings and said tops on the other side of said spring contacting the other of said rings to force both of said rings radially outward and laterally apart.

6. In combination, a pair of packing rings spaced apart, a spring in said space and comprising a radially expansible body, rectangular in cross-section and the longer sides of this rectangle substantially radial, corrugations extending sidewise and alternately on each side of said body and the top of each adapted to contact the respective of said rings to exert an oblique pressure thereon.

OTTIS R. BRINEY.